EDWARD C. POWELL,
JAMES H. RILEY,
ALEXANDER SILVER,
INVENTORS.

BY John H. J. Wallace

May 1, 1962 J. H. RILEY ETAL 3,032,056
REGULATING VALVE
Filed April 1, 1957 2 Sheets-Sheet 2

EDWARD C. POWELL,
JAMES H. RILEY,
ALEXANDER SILVER,
INVENTORS.

BY John H. J. Wallace

United States Patent Office 3,032,056
Patented May 1, 1962

3,032,056
REGULATING VALVE
James Hampton Riley, Inglewood, Alexander Silver, Tarzana, and Edward C. Powell, Manhattan Beach, Calif., assignors to The Garrett Corporation, Los Angeles, Calif., a corporation of California
Filed Apr. 1, 1957, Ser. No. 649,815
5 Claims. (Cl. 137—220)

This invention pertains to a regulating valve and more particularly to a regulating valve which is capable of handling high fluid pressures and high fluid volumes, while accurately regulating the outlet pressure of the valve.

In many instances in industry it is necessary to provide regulating valves capable of reducing high pressure fluids to low pressure fluids, while at the same time handling large fluid volumes. Also, in most such cases the regulating valves must be operated from a remote location while maintaining accurate control of the outlet pressure of the valve. In addition, it is often desirable in industrial applications to be able to quickly close the regulating valve so as to prevent damage to other equipment. Such a closing feature should be incorporated as a "fail-safe" feature of the valve so that in case the valve positioning means fails, the valve will automatically close instead of remaining open.

This invention will solve the above problems by providing a valve which is capable of handling very high pressure fluids at very high flow rates. The valve is moved by an actuator which consists of a chamber having a movable wall which positions the valve. One side of the movable wall is subjected to outlet pressure of the valve, while the other side is subjected to a control pressure. The control pressure is supplied from any desired source of fluid having a regulated pressure, and its magnitude is determined by a cam-operated vent valve which vents control fluid from the actuator. Thus, by supplying a fluid having a regulated pressure, the outlet pressure of the valve can accurately be controlled by controlling the opening of the vent valve. The valve of this invention also provides a novel means for balancing the valve, which means can be operated so as to unbalance the valve, thus allowing the use of the unbalanced pressure on the valve to quickly close it.

Accordingly, it is the principal object of this invention to provide a regulating valve which is capable of handling large flows of high pressure fluids with a novel balancing means, which means may be operated to unbalance the valve and allow it to close quickly.

Another object of this invention is to provide a regulating valve with a novel means for controlling the rate at which the outlet or regulated pressure is changed when the control means is moved to a new position.

Another object of this invention is to provide a novel means for balancing an axial flow valve which accurately balances the force acting on opposite sides of the valve, so that the valve may be moved with a minimum force.

Another object of this invention is to provide a novel means for controlling the opening of a vent valve, the opening of which in turn determines the regulated or outlet pressure of the regulating valve.

These and other objects and advantages of this invention will be more apparent to those skilled in the art from the following detailed description of a preferred embodiment when taken in conjunction with the attached drawing in which.

Figure 1:
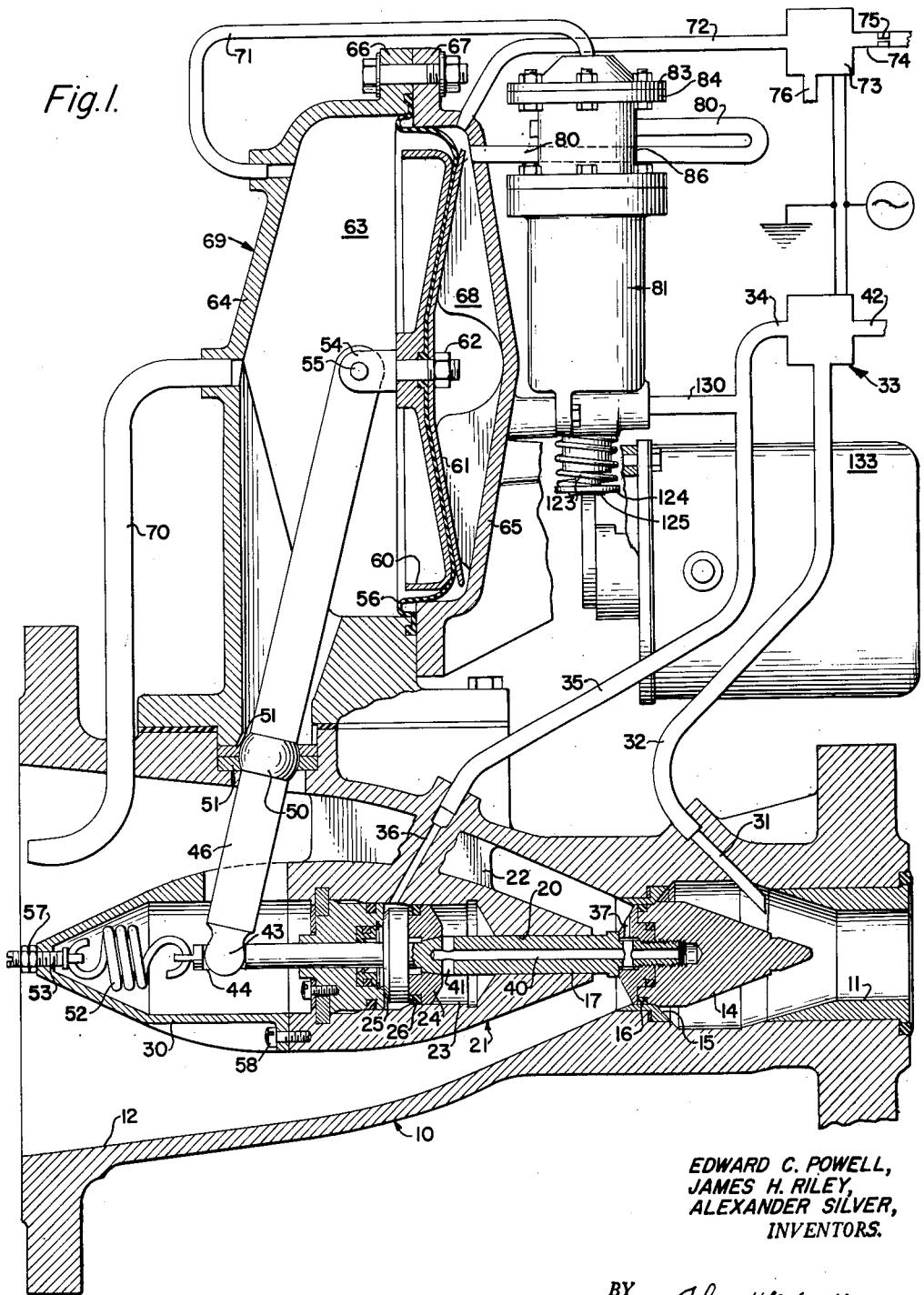
FIG. 1 is an elevational view of the complete valve with some parts shown in section.

Referring particularly to FIG. 1, there is shown an axial flow valve having a tubular valve body 10 which is provided with aligned inlet and outlet openings 11 and 12, respectively. In addition, the cross-sectional area of the central opening of the valve body is gradually increased so that the fluid flowing through the valve may expand gradually as its pressure is reduced. Mounted in the interior of the valve body 10 is a valve plug 14 which is disposed so as to move axially along the longitudinal axis of the valve body. A separate annular valve seat 15 is mounted in the valve body 10 and fastened thereto by any desired means such as threads or the like. The valve seat 15 is provided with a smooth inner bore and the seal between the valve plug 14 and the seat 15 is effected by a sealing ring 16. The sealing ring 16 is designed to form a lip type of seal with the seat 15, so that the high pressure fluid will act to force a portion of the sealing ring 16 into contact with the seat 15 when the valve is closed. The right-hand side of the valve plug 14 is provided with a conical shaped extension which assists in directing fluid flow through the valve.

Threaded into the left-hand or outlet side of the valve plug is a valve stem 17 which extends through a central opening 20 formed in a composite ellipsoidal shaped member 21 whose major axis is aligned with the longitudinal axis of the valve body 10. The composite member 21 is supported from the valve body 10 by means of a web 22 which projects downwardly from the upper wall of the valve body as shown in FIG. 1. A cylinder 23 whose axis is also aligned with the longitudinal axis of the valve body is formed in the interior of the member 21. A piston 24 which is disposed so as to move along the axis of the cylinder 23 is attached to the end of the valve stem 17 by any desired means such as a nut 25. The outer surface of the piston 24 is sealed to the inner surface of the cylinder 23 by means of a sealing ring 26, preferably of the same type as sealing ring 16, or some similar type of resilient sealing ring.

The downstream or outlet side of the cylinder 23 is connected to the pressure existing at the upstream or inlet side of the valve body by means of a tube 31 and a passageway 36 and connecting tubes 32 and 35. The tube 31 which extends partially into the valve body 10 senses the total upstream fluid pressure which is supplied to a solenoid valve 33 by means of the tube 32. The solenoid valve 33 is a three-way valve which may vent the total pressure to the atmosphere by means of a vent opening 42 or supply it to the cylinder 23 by means of an outlet 34. The tube 35 connects the outlet 34 to the passageway 36 formed in the valve body, which passageway opens into the outlet side of the cylinder 23. The pressure existing on the downstream or outlet side of the valve plug 14 is connected to the inlet or upstream side of the cylinder 23 by means of passageways 37, 40 and 41 which are formed in the valve plug 14 and the valve stem 17, respectively. As can easily be seen in FIG. 1, the circumferentially spaced passageways 37 are formed in the valve plug 14 so that they open on the back or outlet side of the valve plug 14. This is necessary in order that the fluid pressure which is applied to the inlet side of the piston 24 is the same pressure which actually exists on the outlet side of the valve plug 14. In a valve which is capable of handling high flow rates, the pressure on the outlet side of the valve plug is not the same as the static pressure which exists in fluid stream at the outlet side of the valve. Thus, in order to accurately balance the valve, the pressure which actually exists on the outlet side of the plug must be determined and applied to the inlet side of the piston 24. Likewise, it is necessary to determine the total pressure acting on the inlet side of the plug 14 and apply it to the outlet side of the piston 24. The total pressure, of course, is a combination of the inlet pressure plus the impact pressure acting on the plug 14.

From the above description, it can easily be seen that this invention provides an axial flow valve in which the valve plug is disposed to move along the longitudinal axis of the valve body. The above construction also allows accurate balancing of the effective pressures acting on the valve due to the difference in the inlet and outlet pressures of the valve as well as the impact pressures created by fluid flow through the valve. As was explained above, to accurately balance these forces the pressures existing on the inlet and outlet sides of the valve plug must be determined and applied to opposite sides of the piston 24. The tube 31 is inclined at a slight angle to the axis of the valve body shown in FIG. 1 and projects into the valve body 10 so that total pressure sensed by the tube 31 very closely approximates the total pressure acting on the inlet side of the valve plug 14. This inlet pressure can then be applied to the outlet side of the piston 24 to accurately balance the forces acting on the valve. To close the valve it is only necessary to position the solenoid valve 33 so that total pressure sensed by the tube 31 and supplied to the solenoid valve 33 is vented to the atmosphere through vent opening 42. This immediately unbalances the force acting on the valve plug 14 and the much larger force, due to the high inlet pressure acting on the inlet side of the valve plug, immediately closes the valve. The solenoid 33 may be connected so that it must be energized to connect the total pressure sensed by the passageway 31 to the outlet side of the piston 24, thus the valve will close when the solenoid 33 is de-energized.

The use of a lip seal 16 between the valve plug 14 and valve seat 15 results in substantially equal effective areas on the inlet and outlet side of the valve. Thus, only a slight force is necessary to open the valve which would not be the case if a more conventional valve seat arrangement, such as a globe valve seat, were used due to the difference in areas on opposite sides of the valve plug caused by the area of the seat. While the area of the valve seat is part of the total area of the outlet side of the valve plug when the valve is opened, when closed it must be subtracted from the area of the outlet side of the valve. When the valve is handling very high pressure fluids, the force due to this difference in areas results in a valve that is difficult if not impossible to open.

The valve plug 14 is positioned by means of an actuating lever 46 which is connected to the end of the valve stem 17. The actuating lever 46 is connected to the end of the valve stem by means of a ball-shaped end 43 on the lever which fits in an opening 44 formed in the end of the valve stem. The actuator lever 46 is pivoted at a point between its ends by means of an enlarged ball-shaped section 50 which is retained by means of two washers 51 whose inner surfaces are spherically shaped so as to retain the enlarged ball-shaped section 50. The two washers 51 are retained in an opening in the valve body 10 by any desired means (not shown). To insure that the valve remains closed when the high inlet pressure is removed from the valve plug 14, a small closing spring 52 is secured to the downstream end of the valve stem 17. The other end of the closing spring is secured to an eyebolt 53 which passes through an opening in the rear cover 30 of the composite member 21 and is secured thereto by means of a nut 57. The rear cover 30 is secured to the main portion of the composite member 21 by a plurality of cap screws 58.

The upper end of the actuating lever 46 is pivotally connected to a diaphragm 56 by means of a bolt 54 having a forked end and a pin 55. The bolt 54 passes through a central opening in a cup-shaped diaphragm washer 60, the diaphragm 56 and a diaphragm washer 61 and is secured thereto by a nut 62. In addition to pivotally connecting the upper end of the actuating lever 46 to the diaphragm members, the bolt 54 serves to secure the diaphragm washers and the diaphragm together so that they will move as a unit. The outer edge of the diaphragm 56 is secured between the outwardly projecting radial flanges 66 and 67 which project from the adjacent surfaces of the two halves 64 and 65 of the actuator housing or cylinder 69, respectively. The flanges 66 and 67 are secured together by a plurality of circumferentially spaced bolts or other means. The left-hand chamber 63 of the actuator housing is connected to the fluid pressure existing on the outlet side of the valve by means of a tube 70. The end of the tube 70 which projects into the interior of the valve body 10 is turned so that it faces away from the direction of the flow so that it will sense essentially the static pressure existing at the outlet of the valve. The pressure existing in the chamber 63 is also connected to one side of a relief valve 85 mounted in the same housing as vent valve 81 by means of a tube 71, as seen in FIG. 2 and which is described below.

The right-hand chamber 68 of the actuator housing is connected to a source of fluid having a controlled pressure by means of a tube 72. The tube 72 is connected to the outlet of a three-way solenoid valve 73, the inlet of which is connected to the source of pressurized fluid by means of a tube 74. Mounted in the tube 74 is an orifice 75 which meters the flow of pressurized fluid through the tube 74. The solenoid valve 73 is also provided with a vent opening 76 which is connected to the atmosphere. The source of fluid having a controlled pressure may be obtained from the inlet side of the valve or from an independent source (not shown in FIG. 1). The right-hand chamber 68 is also connected to the vent valve 81, by means of a small tube 80. The vent valve 81 controls the escape of the pressurized fluid admitted to the actuator through the tube 72, as will be explained below.

The above described actuator which is subjected to the outlet pressure on one side and a metered amount of fluid having a controlled pressure on the other side, will accurately position the valve plug 14 with respect to the valve seat 15. Due to the substantially balanced construction of the valve, a very slight pressure difference across the diaphragm 56 will move the valve. The outlet pressure of the valve, which is also the regulated pressure of the valve, is introduced into the chamber 63 on one side of the diaphragm 56 and is balanced by the pressure existing in chamber 68 on the other side of the diaphragm 56. The pressure in chamber 68 is controlled by the vent valve 81, as explained below. Thus, all that is necessary to change the regulated pressure of the valve is to change the opening of the vent valve, which in turn will change the pressure in chamber 68. The orifice 75 in the tube 74 will fixedly control the rate of flow of pressurized fluid into the right-hand chamber 68 of the actuator, while the vent valve 81 can vent the pressure from the chamber 68 at any desired rate. Thus, the control of the position of vent valve 81 permits one to control the rate at which the valve plug is moved.

Figure 2:
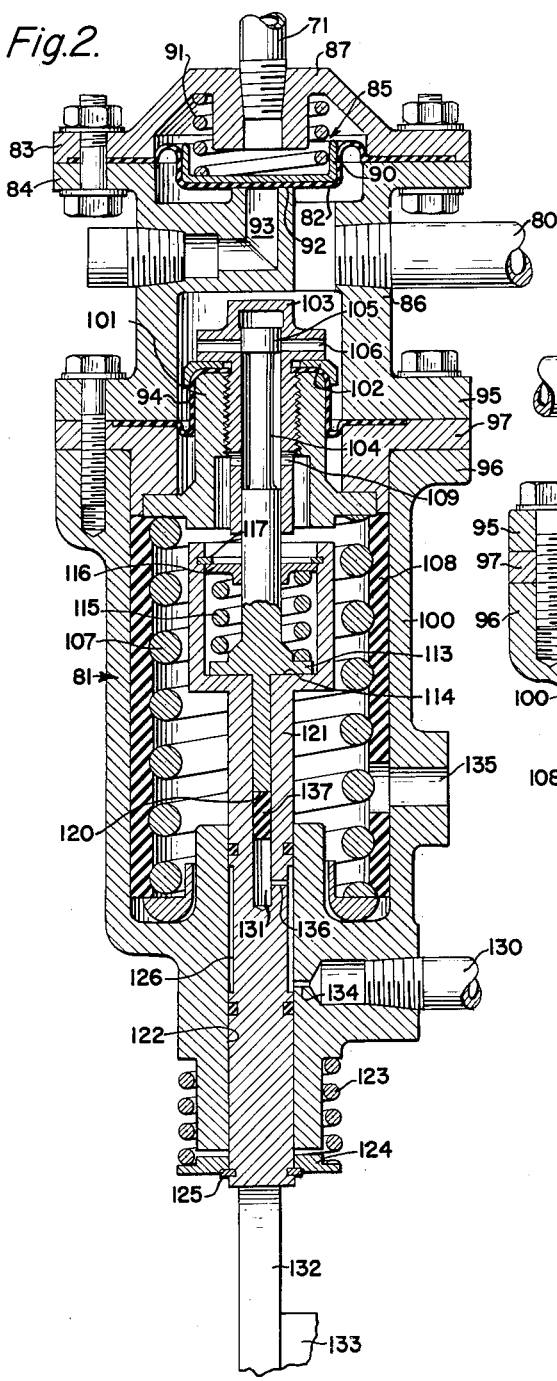
FIG. 2 is an enlarged cross-sectional view of the vent valve which is used to control the fluid pressure acting on one side of the actuator diaphragm.

Referring now to FIG. 2, it can be seen that the vent valve 81 actually consists of two valves; a relief valve 85 located in the upper portion of the vent valve body, and a vent valve disposed in the lower portion. The relief valve has a diaphragm 82, the outer edges of which are clamped between the outwardly projecting flanges 83 and 84 formed on the top cover 87 and the intermediate section 86 of the vent valve housing, respectively. A light spring 91 is mounted in the top cover and bears against a spring washer 90 so as to urge the diaphragm 82 in a downward direction. The lower surface of the diaphragm 82 seals against a flat surface 92 formed on the end of the exhaust passage 93 of the relief valve. The tube 80 which connects the vent valve to chamber 68 of the actuator opens into the interior of the intermediate section 86 of the vent valve. Thus, when the pressure in the chamber 68 of the actuator acting on one side of the diaphragm 82 exceeds the outlet pressure of the valve plus the force of spring 91, which is applied to the other side of the diaphragm 82, the diaphragm will be lifted from the surface 92 of the exhaust opening and chamber 68 of the actuator will be vented to the atmosphere, through the exhaust opening 93. The pressure in chamber 68 of the actuator will increase rapidly when the forces acting on the valve plug 14 are unbalanced by opening the solenoid valve 33 to the atmosphere, as was explained above. In order to prevent damage to the diaphragm 56 and the remainder of the actuator, some means must be provided to quickly vent this rapidly increasing pressure to the atmosphere.

The vent valve has a diaphragm 94 having a central opening which is closed by a piston type valve. The opening of the vent valve is controlled by the movement of the diaphragm 94 and the position of the piston valve stem disposed below the central opening in the diaphragm. The outer edges of the diaphragm 94 are retained between the outwardly projecting flanges 95 formed on the intermediate section 86 and a spacing member 97 inserted between the flange 95 and a flange 96 formed on the bottom section 100 of the vent valve housing. The central portion of the diaphragm 94 is clamped between a tubular member 101 and an upper diaphragm washer 102 by means of a closed end tubular nut 103, which passes through the central opening in the diaphragm and threads into tubular member 101. The nut 103 is provided with a plurality of circumferentially spaced radial passageways 106 which open into the bore of the nut 103.

The piston valve consists of a plunger 104 which is disposed so as to move axially in the bore of the nut 103. The plunger 104 is provided with an enlarged upper portion 105 which is a close fit in the bore of the nut 103 so that it will close the radial passageways 106 in the nut 103 when the lower edge of the portion 105 travels below the radial openings. Fluid which is vented by the vent valve escapes to the atmosphere through an opening 109 formed in the side wall of the nut 103 and an opening 135 formed in the side wall of the bottom section 100 of the vent valve. The center portion of the plunger 104 is provided with an outwardly projecting flange 113 which engages an inwardly projecting shoulder 114 formed on the valve lifter 121. The outwardly projecting flange 113 on the plunger is urged into engagement with the shoulder 114 by means of a light compression spring 115. The light compression spring 115 is retained in position by means of a spring washer 116 and a snap ring 117 which holds the spring washer in place.

Surrounding the outside of the valve lifter 121 is a relatively heavy compression spring 107 which reacts against the bottom section of the vent valve housing at its lower end and against the lower surface of the tubular member 101 of the vent valve at its upper end. The spring 107 is designed to resist the downward movement of the diaphragm 94 caused by an increase in the pressure existing in chamber 68 of the actuator. Surrounding spring 107 is a tubular vibration dampener 108 which is formed of a resilient material such as rubber or the like. The lower end of the valve lifter 121 projects through an opening 122 in the bottom wall of the lower section 100 of the housing so that it may be positioned by a cam 132. The cam 132 is rotated by a suitable gear motor 133, of any well known design which will allow accurate positioning of the cam 132. The lower end of the valve lifter 121 is urged into engagement with the cam 132 by means of a compression spring 123 which reacts against an outwardly projecting shoulder formed on the bottom section 100 and a spring washer 124 which is retained on the end of the valve lifter by means of a snap ring 125.

A portion 126 of the valve lifter 121 which passes through the opening 122 in the bottom section 100 of the vent valve housing is reduced in diameter. The inlet pressure of the valve which is sensed by the tube 31 is introduced into the relieved portion of the valve lifter, by means of a tube 130, which is connected to the outlet of solenoid valve 33, and a passageway 134 formed in the bottom section 100 of the vent valve housing. The reduced portion 126 of the valve lifter is connected to a central bore 131 in the valve lifter 121 by means of a radial passageway 136 so that the pressure sensed by the tube 31 may be applied to the lower end 120 of the plunger 104. Leakage of fluid past the lower end 120 of the plunger is prevented by a sealing plug 137 adjacent the lower end 120 which is formed of a resilient material such as rubber or the like.

The inlet pressure of the valve which is applied to the end 120 of the plunger 104 tends to move the plunger upward, which movement is resisted by the force of the spring 115. Thus, the position of the plunger 104 will be influenced by a change in the inlet pressure of the valve permitting the valve to maintain a constant predetermined outlet pressure regardless of the change in the inlet pressure.

From the above description it can easily be seen that the opening of the vent valve can be easily controlled by adjusting the position of the plunger 104. The position of the plunger 104, in turn, can be adjusted by rotating the cam 132 which in turn moves the valve lifter 121 to reposition the plunger. Thus, when the fluid from the controlled pressure source is admitted to chamber 68 it will also flow into the intermediate section 86 of the vent valve. The fluid pressure will then force the diaphragm 94 downwardly and open the vent valve when the radial openings 106 in the tubular nut 103 pass the lower edge of the enlarged head portion 105 of the plunger. When the radial openings pass the lower end of the enlarged portion 105 of the plunger, the vent valve will open and the fluid pressure will flow from chamber 68 of the actuator to the atmosphere. Thus, by positioning the plunger 104 the pressure in chamber 68 can be accurately controlled. As was explained above, the actuator will open the valve plug 14 until the pressure in chamber 68 is equalled by the outlet pressure of the regulating valve manifested in chamber 63. In addition to controlling the outlet or regulated pressure of the valve, the vent valve can also be used to control the rate at which the outlet pressure of the regulating valve is changed. This can be accomplished by rotating the cam at any desired speed when it is desired to change the outlet pressure of the valve.

Figure 3:
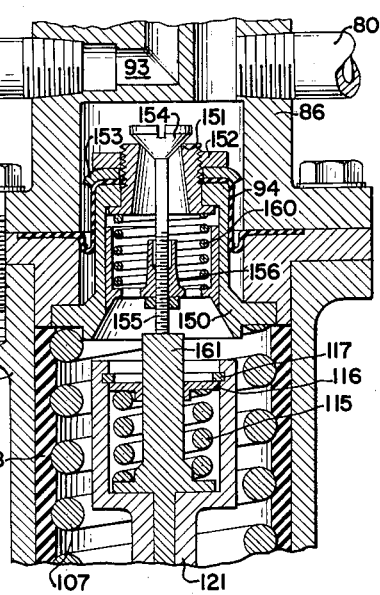
FIG. 3 is a partial view showing a modified vent valve.

Shown in FIG. 3 is a slightly modified vent valve for controlling the pressure existing in chamber 68 of the actuator. In this figure, elements which are identical with the elements of the vent valve, shown in FIG. 2, have the same reference numerals. The vent valve of FIG. 3 includes a diaphragm 94, the outer edges of which are clamped between the flange 95 and the spacing member 97 in the same manner as the diaphragm 94 shown in FIG. 2. The diaphragm 94 is provided with a central opening in which the valve seat 151 is mounted. The valve seat, in addition, serves to secure the tubular diaphragm washer 150 to the bottom surface of the diaphragm and the diaphragm washer 153 to the top surface of the diaphragm. The diaphragm washers 150 and 153 are secured in place by means of a nut 152 which threads over a portion of the valve seat 151 which projects through the central opening in the diaphragm 94. A conical shaped valve disc 154 is disposed so that its conical surface will seat on the top inner edge of the valve seat 151 as shown in FIG. 3. A valve stem 155 projects downwardly from the center of the conical surface of the valve disc 154 and is provided with a threaded portion at its lower end. The extreme lower end of the valve stem 155 rests on the upper end of a modified plunger 161. A light spring 160 is mounted in the interior of the tubular diaphragm washer 150 and reacts at its upper end against the lower surface of the valve seat 151 and at its lower end against an inwardly projecting flange formed on the cup-shaped nut 156 to urge the valve disc 154 into engagement with the valve seat 151. The cup-shaped nut 156 threads onto the lower end of the valve stem 155. The force exerted by the spring 160 can easily be adjusted by adjusting the position of the cup-shaped nut 156 on the valve stem 155.

The operation of the vent valve shown in FIG. 3 is similar to the vent valve shown in FIG. 2 in that the valve disc 154 remains in engagement with the valve seat 151 until the lower end of the valve stem engages the upper end of the plunger 161. This action is similar to the opening of the radial passageways 106 formed in the nut 103 by movement of the diaphragm as shown in FIG. 2. The position of the plunger 161, is of course controlled by both the cam 132 and the high pressure fluid which is emitted to the lower end of the plunger 161 (not shown in FIG. 3) in the same manner as shown in FIG. 2. The valve shown in FIG. 3 has the advantage over the vent valve shown in FIG. 2 in that it can accommodate a large flow of fluid from the chamber 68 of the actuator. Thus, it is capable of changing the regulated pressure of the control valve at a faster rate than would be possible with the vent valve shown in FIG. 2.

While but one specific embodiment of this invention has been described in detail, many modifications and changes will, within its broad spirit and scope, occur to those skilled in the art.

We claim:

1. In a pressure regulating valve: means forming an actuator housing, a movable wall dividing said actuator housing into first and second chambers, a valve operating member attached to said movable wall and extending out of said actuator housing; said first chamber being connected to the low pressure side of the pressure regulating valve; said second chamber being connected to a source of controlled pressure fluid; a vent valve for venting fluid from said second chamber, said vent valve having a valve body; a second movable wall dividing said valve body into two portions, said second movable wall having a central opening formed therein; a valve seat mounted on said second movable wall adjacent said central opening; a valve element disposed so as to engage said valve seat; resilient means for urging said valve element into engagement with said valve seat; said second chamber being connected to one portion of said vent valve body; an adjustable valve stem mounted in the other portion of said vent valve body and disposed to engage said valve element when said second movable wall is moved by the pressure of said source of controlled pressure fluid.

2. In a pressure regulator valve: means forming an actuator cylinder; a first movable wall mounted for movement along the axis of said cylinder; a valve operating member connected to said movable wall; one side of said first movable wall being subjected to the pressure existing at the outlet of the pressure regulating valve; the other side of said first movable wall being subjected to the pressure of a control pressure fluid; a vent valve having a tubular valve body; a second movable wall mounted in said vent valve body so as to divide said valve body into first and second chambers; said first chamber being connected to the pressure existing on the said other side of said first movable wall; a valve seat attached to said second movable wall and having a tubular extension projecting from one side thereof; a valve disc disposed so as to engage said seat; said second movable wall having a central opening aligned with the opening in said valve seat; resilient means for urging said valve disc into engagement with said valve seat; an adjustable valve stem mounted in said second chamber and disposed to engage said valve disc when said second movable wall and valve seat are moved by the pressure on said control pressure fluid; resilient means mounted in said second chamber for resisting movement of said valve seat and second movable wall, and means for changing the effective length of said valve stem.

3. In a pressure regulating valve: means forming an actuator cylinder, a first movable wall mounted in said actuator cylinder for movement along the axis of said cylinder, a valve operating member connected to said movable wall; one side of said first movable wall being subjected to the pressure existing at the outlet of the pressure regulating valve, the other side of said first movable wall being subjected to the pressure of a control pressure fluid; a vent valve having a tubular body; a second movable wall mounted in said vent valve body so as to divide said valve body into first and second chambers; said first chamber being connected to the pressure existing on said other side of said first movable wall; said second chamber having a connection with ambient atmosphere; a valve seat attached to said second movable wall and having a tubular extension projecting from said one side thereof; a valve disc disposed in said tubular extension so as to engage said seat, resilient means for urging said valve disc into engagement with said valve seat; said second movable wall having an opening communicating with said valve seat; an adjustable valve lifter mounted in said second chamber and disposed to engage said valve disc when said second movable wall and valve seat are moved by the pressure existing on said other side of said first movable wall; resilient means mounted in said second chamber for resisting movement of said valve seat and said second movable wall; additional means for changing the position of said valve lifter; a relief valve including a third movable wall mounted in said vent valve body to control a passage connecting said first chamber with a zone of low pressure, means for subjecting one side of said third movable wall to the pressure existing at the outlet of the pressure regulating valve, the other side of said third movable wall being subjected to the pressure existing in said first chamber.

4. In a pressure regulating valve: means forming an actuator housing, a movable wall dividing said actuator housing into first and second chambers, a valve operating member attached to said movable wall and extending out of said actuator housing; said first chamber being connected to the low pressure side of the pressure regulating valve; said second chamber being connected to a source of controlled pressure fluid; a vent valve for venting fluid from said second chamber, said vent valve having a valve body; a second movable wall dividing said valve body into first and second portions, said first portion being connected to the pressure existing in said second chamber, said second portion having a connection with ambient atmosphere, said second movable wall having a central opening formed therein; a tubular valve element fastened to said second movable wall and extending through said central opening, said tubular element having a closed end and at least one radial passageway formed in said tubular element adjacent said closed end, said radial passageway connecting one of said portions of said valve body with the interior of said tubular element; a piston valve element disposed in said tubular element and cooperating with said radial passageway to open and close said radial passageway in accordance with movement of said second movable wall, resilient means for urging said piston element toward a position to close said radial passageway and means for adjusting the position of said piston element in relation to said vent valve body.

5. A pressure regulating valve: means forming an actuator housing; a movable wall dividing said actuator housing into first and second chambers; a valve operating member attached to said movable wall and extending out of said actuator housing; said first chamber being connected to the low pressure side of the pressure regulating valve; said second chamber being connected to a source of controlled pressure fluid; a vent valve for venting fluid from said second chamber, said vent valve having a valve body; a second movable wall dividing said valve body into two portions, said second movable wall having a central opening; a first element fastened to said second movable wall and extending through said central opening; a passageway formed in said first element for connecting one of said portions of said vent valve body to the other of said portions; a second element disposed to cooperate with said first element to open and close said passageway in accordance with movement of said second movable wall, said second element extending through said valve body and having means external thereof for adjusting the position of said second element relative to said vent valve body.

References Cited in the file of this patent

UNITED STATES PATENTS

| | | |
|---|---|---|
| 760,595 | Wiesebrock | May 24, 1904 |
| 1,396,501 | Brooks | Nov. 8, 1921 |
| 1,800,352 | Klees et al. | Apr. 24, 1931 |
| 2,407,115 | Udale | Sept. 3, 1946 |
| 2,517,534 | Courtot | Aug. 8, 1950 |
| 2,619,983 | Roberts | Dec. 2, 1952 |
| 2,701,578 | Hamilton | Feb. 8, 1955 |
| 2,707,966 | Taplin | May 10, 1955 |
| 2,710,163 | Mueller | June 7, 1955 |
| 2,731,975 | Boals | Jan. 24, 1956 |
| 2,806,481 | Faust | Sept. 17, 1957 |
| 2,831,494 | Taplin | Apr. 22, 1958 |

FOREIGN PATENTS

| | | |
|---|---|---|
| 652,341 | France | Mar. 7, 1929 |
| 403,787 | Great Britain | Jan. 4, 1934 |